US006424819B1

(12) United States Patent
Yan

(10) Patent No.: US 6,424,819 B1
(45) Date of Patent: Jul. 23, 2002

(54) METHOD FOR THE WIRELESS AND REMOTE TRANSMISSION AND RECEPTION OF CODED INFORMATION, VARIANTS AND PORTABLE DEVICE FOR REALISING THIS METHOD

(75) Inventor: David Yan, Moskva (RU)

(73) Assignee: Cybiko, Inc., Bartlett, IL (US)

( * ) Notice: Subject to any disclaimer, the term of this patent is extended or adjusted under 35 U.S.C. 154(b) by 0 days.

(21) Appl. No.: 09/486,427

(22) PCT Filed: Mar. 16, 1999

(86) PCT No.: PCT/RU99/00078

§ 371 (c)(1),
(2), (4) Date: Feb. 25, 2000

(87) PCT Pub. No.: WO00/28680

PCT Pub. Date: Mar. 18, 2000

(30) Foreign Application Priority Data

Nov. 5, 1998 (RU) .......................................... 98119851

(51) Int. Cl.⁷ .............................. H04B 7/15; H04R 7/38
(52) U.S. Cl. ......................... 455/11.1; 455/16; 455/517; 455/414
(58) Field of Search ............................ 455/11.1, 15, 16, 455/18, 20, 445, 517, 422, 414; 340/825.44; 370/315

(56) References Cited

U.S. PATENT DOCUMENTS

| | | | | |
|---|---|---|---|---|
| 4,549,293 A | * | 10/1985 | Christian et al. .......... | 455/11.1 |
| 4,597,090 A | | 6/1986 | Forney, Jr. .................. | 375/261 |
| 4,685,115 A | | 8/1987 | Akagiri et al. .............. | 375/244 |
| 5,283,679 A | | 2/1994 | Wedding ..................... | 359/154 |
| 5,790,938 A | * | 8/1998 | Talarmo ..................... | 455/11.1 |
| 5,850,593 A | * | 12/1998 | Uratani ....................... | 455/11.1 |

(List continued on next page.)

FOREIGN PATENT DOCUMENTS

| | | |
|---|---|---|
| DE | 31 38 318 | 9/1981 |
| DE | 35 37 730 | 4/1987 |
| EP | 04 46 194 | 9/1991 |
| EP | 0 332 345 | 9/1995 |
| FR | 2 573 593 | 11/1984 |
| FR | 26 15 957 | 12/1988 |

(List continued on next page.)

*Primary Examiner*—Nguyen T. Vo
*Assistant Examiner*—Dac Nguyen
(74) *Attorney, Agent, or Firm*—J. Harold Nissen; Lackenbach Siegel

(57) ABSTRACT

This invention relates to radio engineering, and in particular it concerns a method of establishing contact between users. The method consists in that, in a portable computerized device combined with a radio transceiver, data comprising an array of formed information, which is, upon conversion, assigned a personal code, is inputted into the memory. Then, this code is transmitted in the form of pulsed radio signals through the propagation medium for reception thereof by other devices operating within the range of the first device. Upon reception of pulsed code radio signals transmitted by other devices, the codes received are compared with the personal code, and when one of the codes received is found to coincide with the personal code, the received data corresponding to that code is decoded and outputted for visual or audio perception of the information array corresponding to that code. On coincidence, a pulsed coincidence radio signal is transmitted in the coincidence code and a response pulsed radio signal in the personal code is received for the users to identify one another. Following reception of the pulsed personal code radio signals confirming establishment of direct contact, the users' devices are switched to a direct communication mode for the users to communicate with each other. In the absence of coincidence between the codes received and the personal code, these codes are inputted into the memory and transmitted into the propagation medium, transmission being effected during the absence of a pulsed radio signal carrying the code corresponding to the personal code.

7 Claims, 6 Drawing Sheets

U.S. PATENT DOCUMENTS 5,907,794 A * 5/1999 Lehmusto et al. ......... 455/11.1
5,987,011 A * 11/1999 Toh ............................ 370/331
6,052,557 A * 4/2000 Kinunen et al. ............... 455/9

FOREIGN PATENT DOCUMENTS

| GB | 2 164 822 | 3/1986 |
| RU | 1 133 679 | 1/1985 |
| RU | 2 106 071 | 2/1998 |
| RU | 2 106 171 | 3/1998 |
| RU | 2121227 | 10/1998 |
| WO | WO 86/06915 | 11/1986 |
| WO | WO 88/01466 | 2/1988 |
| WO | WO 88/08140 | 10/1988 |
| WO | WO 89/00370 | 1/1989 |
| WO | WO 90/13828 | 11/1990 |

* cited by examiner

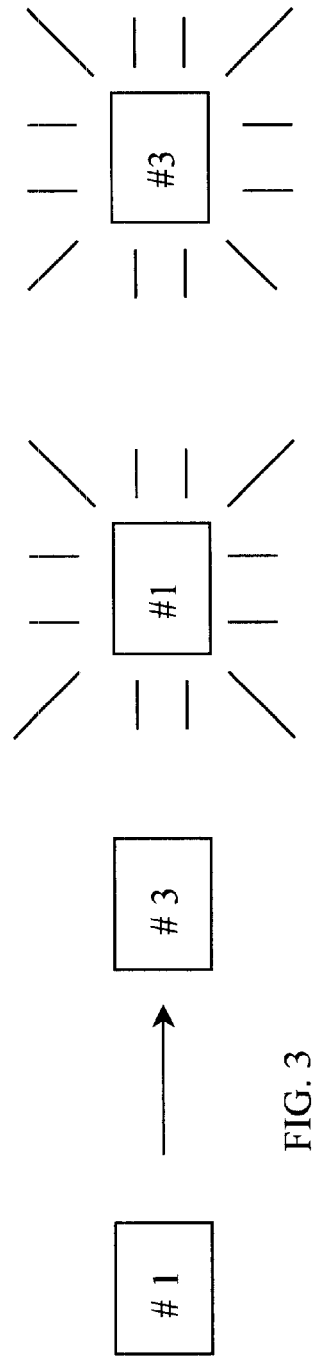
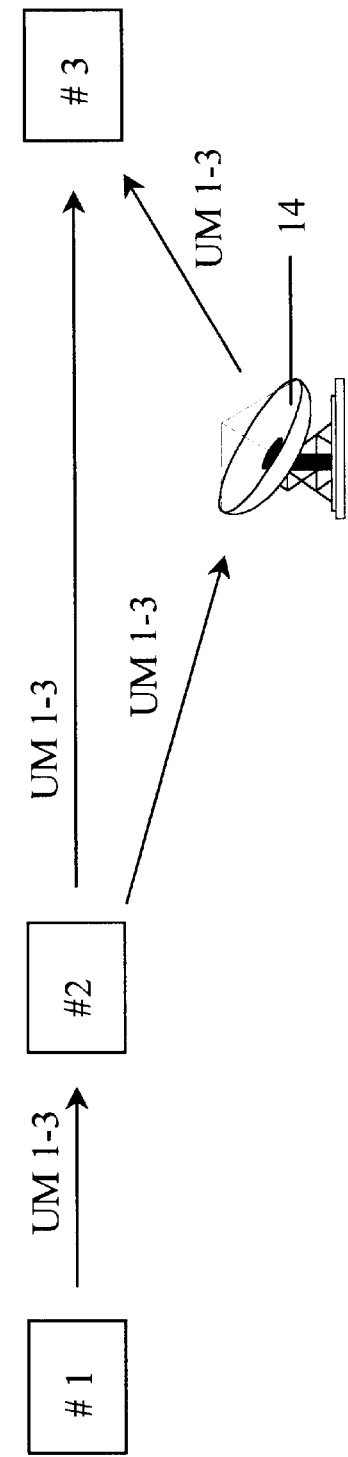
FIG. 5
FIG. 4
FIG. 6
FIG. 2
FIG. 3

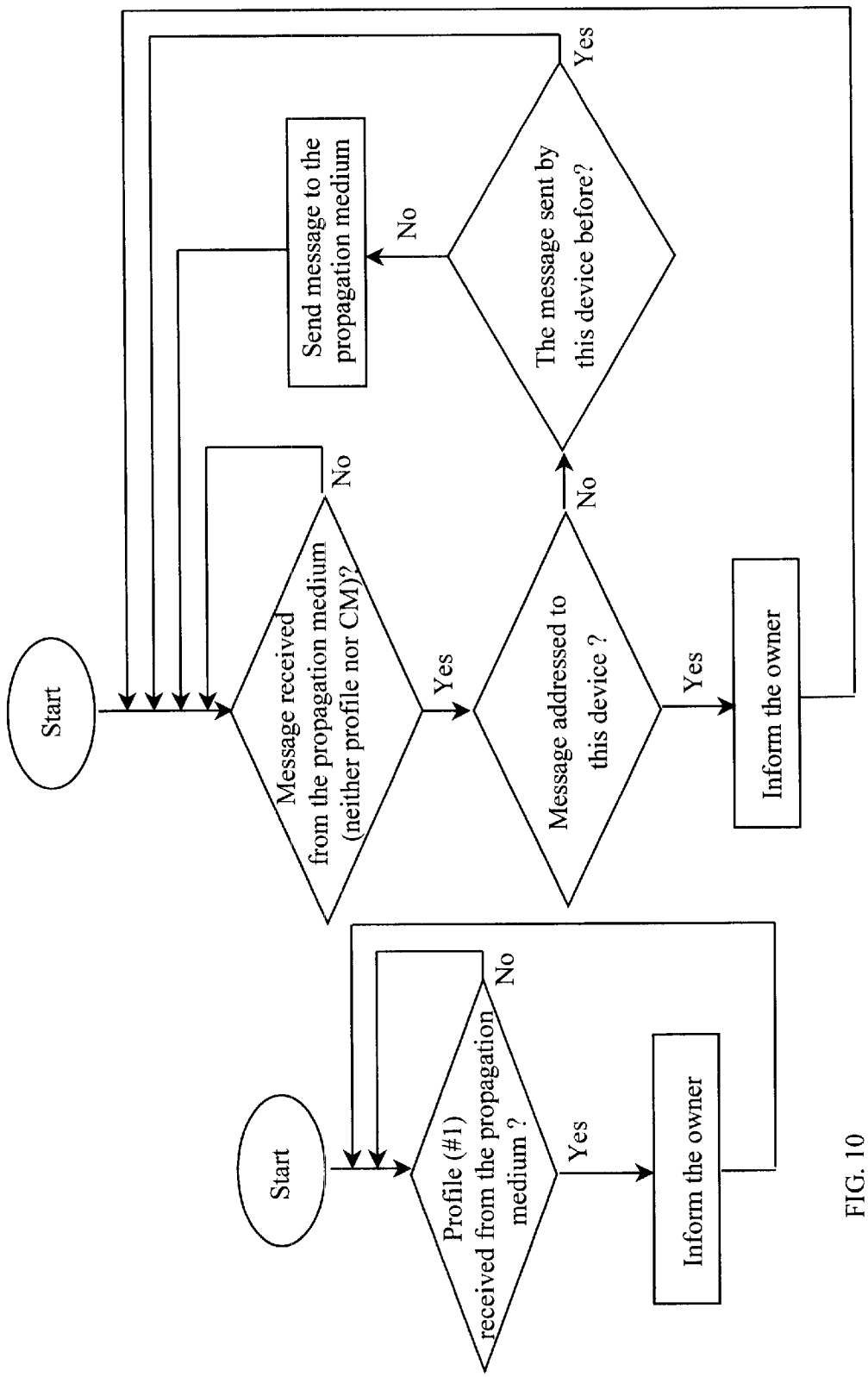

METHOD FOR THE WIRELESS AND REMOTE TRANSMISSION AND RECEPTION OF CODED INFORMATION, VARIANTS AND PORTABLE DEVICE FOR REALISING THIS METHOD

FIELD OF INVENTION

This invention relates to radio engineering, and in particular it concerns methods of and devices for shaping code data for remote wireless transmission and reception of target information to establish contact between users carrying portable devices combined with limited range radio transceivers. The invention consists in a process of searching for desired people and required information sources, establishing contacts between people, including friendly, business and professional contacts, sexual, family-building contacts, contacts involving hobbies, interests, commerce, collecting, music, literature, arts, cinema, theater, sports, including socialization within communities of fans, mutual exchange of information, and games with one or more participants.

PRIOR STATE OF THE ART

At present, a portable pocket device known as Lovegetty, comprising a miniature radio transceiver, is in wide use. Once activated, a Lovegetty device emits a periodic radio signal of specific characteristics. Similar devices, activated and positioned at a close distance from the signal source, are capable of receiving this signal and informing its owner, by audio call, vibration call or any other means, about the signal having been received. The Lovegetty's owner, therefore, will always be able to determine if there is someone with another activated Lovegetty device nearby.

The idea of using this device is helping people seeking to expand their range of acquaintances to establish contact with one another. A Lovegetty device switched on in the pocket signals its owner's desire to make new friends or find like-thinking people. Two device owners finding themselves in close proximity can immediately become acquainted, for either of them knows that the other is ready for this.

This Lovegetty device is disadvantageous in that it is too much simple, and does not allow any additional functions to be realized or make a search for friends more determined and purposeful. A radio signal emitted by a Lovegetty device does not carry any substantial information. For this reason, even if its owner really wanted to get acquainted with some stamp collectors over 55 years of age, his Lovegetty device would also respond to a radio signal sent by a 14-year-old rock aficionado, which would not lead to anything more than waste of time on both sides.

Accordingly, the search for, and contact with, a desired user or like-thinking person is complicated, because the signal emitted by the Lovegetty does not carry any specialized profile information allowing signals to be discriminated from one another on reception and a signal carrying target profile information to be singled out. Profile is a set of standard information about a customer (user), commonly including gender, age, anthropometric characteristics, hobbies, etc. Target profile is understood to mean information similarly organized by the customer (user) about a target of his or her search. Understandably, the customer (user) profile is always specific (describing a really living particular individual), whereas the target profile always contains tolerable ranges ("age from 30 to 40, height from 1.60 to 1.85 m, and so on). The lack of function of comparing existing customer profiles against available target profiles in a certain formalized comparison algorithm indicating the coincidence rate of profiles in certain conventional units, for example, points, does not allow a user to find a desired counterpart or like-thinking person within a certain local milieu efficiently or rapidly.

Known in the art is a method of wireless transmission and reception of code information for remote search and identification between two users, wherein a portable computerized device combined with a transceiver is adapted to input, using an alphanumeric keyboard, into its memory data constituting at least one array of generated information; transform the data of each information array to a personal code; transmit at least one personal code in the form of pulsed radio signals through the propagation medium to be received by the transceiver of at least one other portable computerized device operating within the range of the transceiver of the first device; receive pulsed code radio signals emitted by the transceivers of any other portable computerized devices; compare the codes received with at least one personal code; and, if the personal code is found to coincide with at least one of the codes received in at least a majority of data, decode and output the received data corresponding to that code to perceive visually or hear the information array corresponding to that code; further, on establishing correspondence between the information array received and the information array stored in the memory, send a pulsed coincidence radio signal in the code, in which coincidence has been established, in order to establish direct contact with the user of that code, and receive a response pulsed radio signal in the personal code for the users to identify each other, confirming the establishment of direct contact (ref. French Application No. 2,615,957, GO1S 3/00, published Dec. 2, 1988).

This prior art method of transmitting and receiving code information by users for searching and identifying one another at a distance is specific in that a pulsed radio signal emitted into the propagation medium carries specific information converted into a code that can only be received by a user the memory of whose device stores information corresponding to that transmitted. Accordingly, a specific user is enabled to reduce the time needed to find another, desired user or like-thinking person by reception being denied to the code information from users whose codes do not correspond to the requirements of the particular user.

This method is disadvantageous in that it is only usable in a localized zone at a small signal transmission range and is intended for a small number of users. For contact to be established by this method, it is essential that all the users be present in the same localized area within the effective range of their radio transceivers. In this range only can a user receive signals from any other user. If the two users are at a distance exceeding the range of their radio transceivers, no contact can be established between them. This method, as a novel form of communication and contact, was developed and designed for search to be effected for people with the purpose of making their acquaintance in the conditions of so-called acquaintance clubs. This method helps simplify the formation of a database of club members and visitors, compare existing customer profiles with available target profiles manually or by computer, in order to establish the rate of coincidence and support measures for contacts to be established between customers.

Another drawback of this method is its low accuracy and considerable difficulty in determining the location of one user relative to another user because the signal received does not carry any specific information. According to this method, an audio signal only indicates that a desired user is nearby. Direct contact cannot be established at a distance. If connection is established between the users (indicated by a beep-beep signal), search is conducted by turning the frame antenna to ascertain the direction of maximum loudness of the audio signal. Search is conducted according to the level of the signal, provided always that one user seeks, while the other stands in place. If the second user moves at this time, changes in the audio signal in the first user's device would require the direction to be adjusted.

The developers of this method did not intend to go beyond club territory. It has been established, however, that many people wanting to make new friends do not rely on the facilities of such dating services and clubs for many reasons—shortage of time or money, reticence, lack of faith in a positive result, and so on. Besides, many of existing singles clubs and dating services have been set up with the only aim of promoting marriage through new friendships, and do not allow, for example, people to make friends for taking up sports or other pursuits together.

Known in the art is a portable device for remote wireless transmission of code information, comprising a radio transceiver having a receiving part designed to receive pulsed input radio signals, a transmitting part designed to transmit pulsed output signals into the propagation medium, a mini-processor associated with these two parts and forming, together with a memory unit, a software unit, a digital-to-analog and analog-to-digital converter unit, and an input-output unit, a mini-computer provided with a display to visually represent the information being received and transmitted, an alphanumeric keyboard for inputting data into the memory unit of the computer and an audio-announcing unit, designed to generate audio signals, the mini-computer being provided with appropriate software to perform the functions of receiving analog signals from the receiving part, converting said signals into digital signals, comparing the data of these signals with the data stored in the memory unit, processing the digital signal carrying data in a code corresponding to the personal code stored in the memory unit and the data inputted from the keyboard to generate personal codes, and outputting an analog signal confirming reception of data in the coincidence code to the transmitting part for transmission thereof through the propagation medium within the framework of a single protocol (ref. French Application No. 2,615,957, GO1S 3/00, published Dec. 2, 1988).

This device is disadvantageous in that it has an inadequate functional efficiency, because the device performs, in accordance with the prior art method, the functions of receiving and transmitting target information only and has a limited effective range.

DISCLOSURE OF THE INVENTION

The present invention is aimed at solving an engineering problem of expanding the range of transmission and reception of target code information at a distance to establish contact between users carrying portable devices combined with limited range radio transceivers without changing the range thereof. The technical result achieved by this invention consists in improving the efficiency of targeted search of one user by another and in establishing contact between the users.

The above technical result is, in respect of a first method, achieved by that, in a method of wireless transmission and reception of code information for users to search for and identify one another at a distance, wherein data comprising at least one array of generated information is inputted from an alphanumeric keyboard into the memory of a portable computerized device combined with a radio transceiver, the data in each information array is then converted into a personal code; at least one personal code is transmitted in the form of pulsed radio signals through the propagation medium to be received by the radio transceiver of at least one other portable computerized device operating within the range of the radio transceiver of the first device; the pulsed radio signals carrying the codes emitted by the radio transceivers of other portable computerized devices are received; the codes received are compared with at least one personal code; and, if at least one of the codes received is found to coincide with the personal code in at least a majority of the data, the received data corresponding to such code are decoded and outputted for visual or audio perception of the information array corresponding to that code; if the information array received corresponds to the information array stored in the memory, a pulsed radio coincidence signal is transmitted in the code in which coincidence has been established for achieve direct contact with the user of that code; and a pulsed response radio signal confirming establishment of direct contact is received in the personal code for the users to identify one another; the radio transceivers of the users are, following reception of the pulsed radio signals in the personal code confirming establishment of direct contact, switched to the radio communication mode, while in the absence of coincidence between the codes received and the personal code those codes are inputted temporarily into the memory and pulsed radio signals of these codes are transmitted at least once or during a specified time interval into the propagation medium, the pulsed radio signals of the codes, which do not coincide with the personal code, being transmitted during at least the absence of the pulsed radio signal carrying the code, corresponding to the personal code in at least a majority of data.

In this process, as data is inputted into the memory from the alphanumeric keyboard and represented on the display on the computerized device, a set of data units differing in substantial content from one another is formed, each of the units of the set being encoded and assigned a personal code.

Furthermore, after data units have been formed, at least one code of the set of personal codes is transmitted in the form of pulsed radio signals through the propagation medium to be received by the radio transceivers of other portable computerized devices.

The above technical result of a second method is achieved by that, in a method of wireless remote transmission and reception of code information for establishing contact between users, wherein data representing at least one array of generated information is inputted from an alphanumeric keyboard into the memory of a portable computerized device of one user, said portable computerized device being combined with a radio transceiver, the data in said information array is converted into a personal code of the user; the personal code of the user is transmitted in the form of pulsed radio signals through the propagation medium to be received by the radio transceiver of another portable computerized device of another user, operating within the effective range of the radio transceiver of the first device; the pulsed radio signals of the codes transmitted by the radio transceivers of the portable computerized devices of other users are received; the codes received are compared with the personal code to detect a radio signal carrying a code corresponding to the personal code of the user; and, if any one of the received codes of other users is found to coincide with the personal code, the received data corresponding to that code is decoded and outputted for visual or audio representation thereof; and, in the absence of coincidence between the codes received and the personal code of the user, the codes of the other users are inputted temporarily into the memory and pulsed radio signals of said codes are retransmitted at least once or during a specified time interval into the propagation medium to be received by the radio transceivers of other portable computerized devices or repeaters operating within the effective range of at least one radio transceiver or repeater emitting pulsed radio signals of codes for subsequent retransmission of said radio signals, the radio transceivers of each portable computerized device retransmitting the pulsed radio signals of the codes which do not coincide with the personal code at least during the absence of a pulsed radio signal of a code corresponding to the personal code.

Furthermore, if the coded information array received is found to correspond to the information array stored in the memory, a pulsed coincidence radio signal is sent in the coincidence code to establish direct contact with the user of said code and a pulsed response personal code radio signal confirming establishment of direct contact is received.

After the pulsed coincidence radio signal and the pulsed response radio signal have been transmitted transmission of the radio signals in these codes is terminated.

After the pulsed coincidence radio signal and the pulsed response radio signal have been transmitted transmission of the radio signals in these codes is terminated and a switch is made to radio communication, or video data transmission, or telephone communication, or communication via computer networks.

The above technical result of a third method is achieved by that, in a method of remote wireless transmission and reception of code information, wherein data representing an array of generated information prepared for another user is inputted from an alphanumeric keyboard into the memory of a portable computerized device of a user, said portable computerized device being combined with a radio transceiver, the data in said information array is converted into a personal code of the user; the personal code of the user is transmitted in the form of pulsed radio signals through the propagation medium to be received by the radio transceiver of the computerized device of the other user operating within the range of the radio transceiver of the portable computerized device of the first user; the pulsed code radio signals transmitted by the radio transceivers of the portable computerized devices of other users are received; the codes received are compared with the personal code to identify a radio signal carrying a code corresponding to the respective personal code of the first user; and, if one of the received codes of the other users is found to coincide with the personal code of the first user, the received data corresponding to that code is decoded and outputted for perception thereof and for transmission of the code information to a distance exceeding the range of the radio transceiver of the computerized device, to the radio transceivers of the computerized devices of the other users operating within the range of the radio transceiver of the computerized device of the first user; and, in the absence of coincidence between the received code of the first user and the personal code, the personal code of the first user is temporarily inputted into the memory and pulsed radio signals of that code are retransmitted at least once or during a specified time interval to the propagation medium to be received by the radio transceivers of the portable computerized devices of the users or repeaters operating within the range thereof for subsequent retransmission of said radio signals, the radio transceivers of each portable computerized device retransmitting the pulsed code radio signals, which do not coincide with the personal code, at least during the absence of a pulsed radio signal carrying a code corresponding to the personal code.

The above technical result of the device is achieved by that, in a portable device for remote wireless transmission and reception of code information, comprising a radio transceiver having a receiving part designed to receive pulsed input radio signals, a transmitting part designed to transmit pulsed output signals to the propagation medium, a processor associated with said parts and forming, together with a memory unit and a software unit, a digital-to-analog and analog-to-digital converter unit and an input-output unit, a mini-computer provided with a display to visually represent the information received and transmitted, an alphanumeric keyboard for inputting data into the memory unit of the computer and an audio announcing unit designed for outputting audio signals, the mini-computer being provided with appropriate software to perform the functions of receiving analog signals from the receiving part; converting the same into digital signals; comparing the data of said signals with the data stored in the memory unit; processing the digital signal carrying data in a code corresponding to the personal code stored in the memory unit and the data inputted from the keyboard to form personal codes; and outputting an analog signal confirming the reception of data in a coincidence code to the transmitting part for transmitting the same through the propagation medium within the framework of a common protocol, wherein, in accordance with the invention, the mini-computer is provided with an additional function of temporarily inputting digital signals of codes that do not coincide with the personal codes stored in the memory unit into the memory unit and outputting said signal to the transmitting part for transmission thereof through the propagation medium.

The foregoing features of each of the methods and the device are essential and interrelated to form a stable combination of essential features sufficient to produce the desired technical result.

BRIEF DESCRIPTION OF THE DRAWINGS

The present invention is illustrated with specific examples, which are not exclusive, however, and demonstrably show the possibility of the desired technical result being achieved by the combinations of essential features described herein.

FIG. 2 shows a phase of code information of another user being received by the user;

FIG. 3 shows a transmission phase of a coincidence signal;

FIG. 4 shows a phase of the user being informed of code coincidence;

FIG. 5 shows a phase of directly transmitted messages being exchanged by the users;

FIG. 6 shows a code signal retransmission phase;

FIG. 10 shows a coincidence signal message waiting mode (an Awaiting Friend sub-mode);

FIG. 11 shows a local retransmission mode; and

PREFERRED EMBODIMENTS OF THE INVENTION

Figure 1:
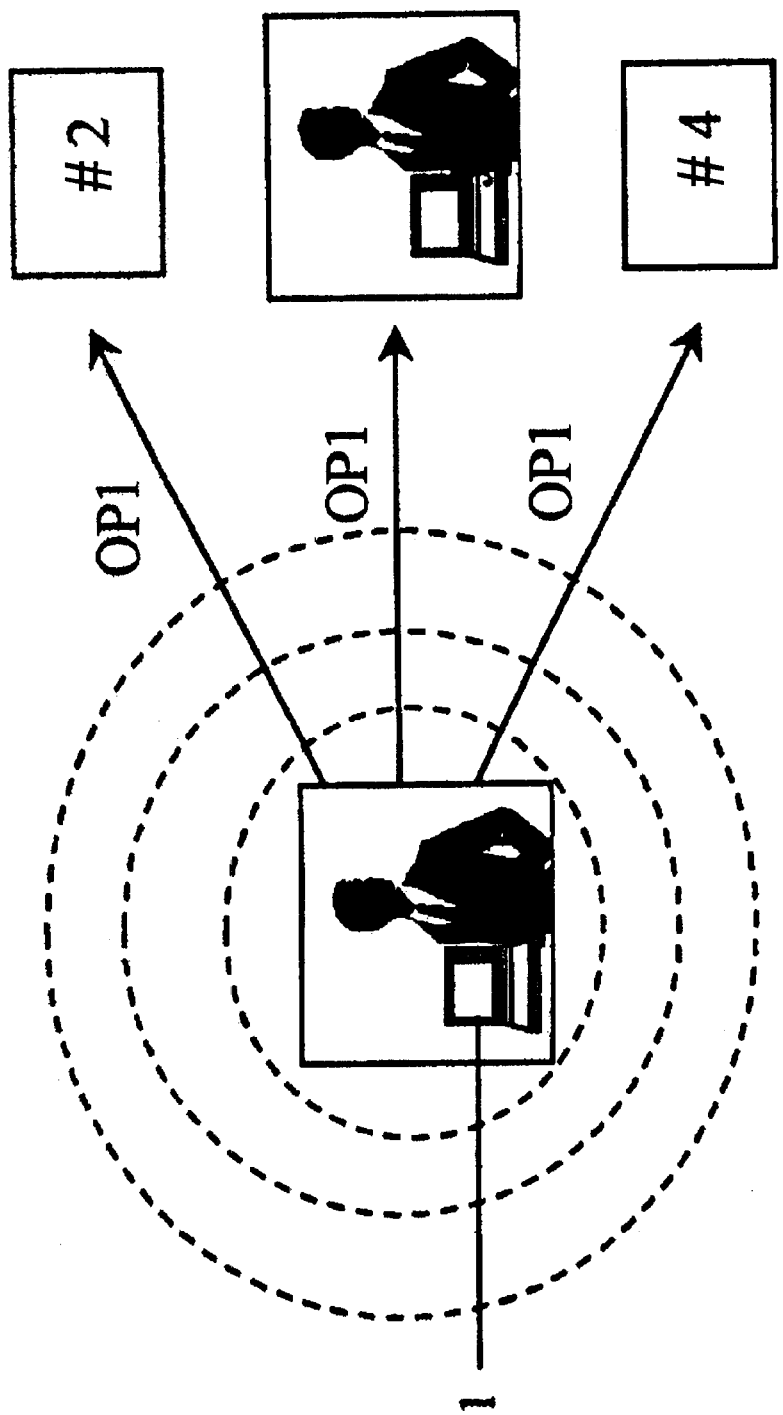
FIG. 1 shows a phase of code information being transmitted by a user.
Figure 7:
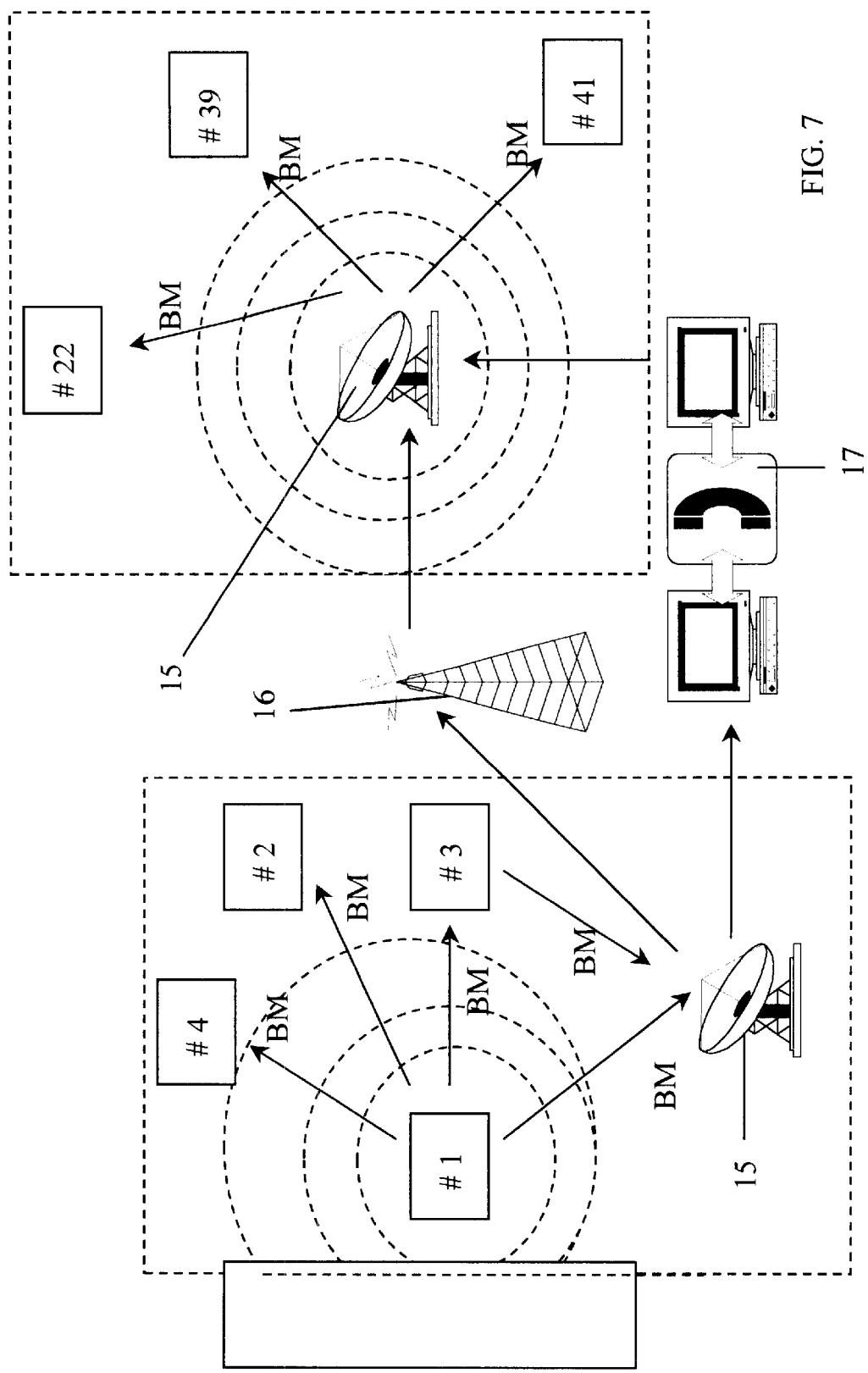
FIG. 7 shows a phase of global code signal retransmission.

A method of remote wireless transmission and reception of code information by users for seeking and identifying one another for establishing contract is based on the users activating portable computerized devices 1, each of which is combined with a radio transceiver (FIG. 1). This pocket, small-weight device has a small range for transmitting pulsed radio signals to the propagation medium and for receiving pursed radio signals from identical devices.

User #1 inputs data from an alphanumeric keyboard into the memory of the computerized device, which data forms at least one array of generated information, the data in each information array being then converted into a personal code. When target or profile data is inputted into the memory this data is represented on the computerized device display, the user being capable of forming a set of data blocks differing from each other in substantial content and of encoding each of the blocks which is assigned a personal code different from the personal code of another data block in the set.

The profile of an individual (user) is an array of alphanumeric data comprising, in a strictly specified format, answers to specific questions relating to the individual's anthropometric parameters, attachments and any other specific characteristics. The target profile is construed to be data describing a class of individuals, rather than a particular individual, which individuals possess specific qualities. The answers contained in the target profile, therefore, normally represent tolerable ranges of values (for example, "weight: 60–80 kg").

Having inputted the data, the user transmits (FIG. 1) at least one personal code in the form of pulsed radio signals through the propagation medium to be received by the radio transceiver of at least one other portable computerized device operating within the range of the radio transceiver of the first device and carried by another user, for example, User #2, or #3, or #4. In this case, User #1 can, after having formed data blocks, transmit several out of a set of personal codes in the form of pulsed radio signals in a definite priority or time-base sequence through the propagation medium.

The radio transceivers of the portable computerized devices carried by User #2, #3 and #4 must be present within the range of the radio transceiver of the device of User #1.

User #1 also receives pulsed code radio signals transmitted by the radio transceivers of the other portable computerized devices and compares the codes received with at least one personal code (FIG. 2). For example, User #1 receives signals from User #3.

The coincidence rate may be determined by different algorithms. For example, each parameter of the target profile may be assigned a particular "weight," or numerical value adequate to the importance of the parameter for the target profile author. The like parameters of the owner profile and the target profile are compared in pairs, the comparison results are multiplied by the weight of a respective parameter, and the final total sum is calculated. If the total sum exceeds a pre-assigned threshold value, the profiles are considered to coincide.

After at least one of the codes received is found to coincide with the personal code in at least a majority of data, the received data corresponding to that code is decoded and outputted for visual or audio perception of the information array corresponding to that code by the user. When the information array received is found to correspond to the information array stored in the memory, User #1 sends a pulsed coincidence radio signal (FIG. 3) in the code, in which coincidence has been found, to establish direct contact with the user of that code so the two users could identify each other. If User #3 receives a coincidence signal transmitted in his code, he transmits a response signal. User #1 receives the pulsed response radio signal in the personal code confirming establishment of direct contact.

The code coincidence signals transmitted and received reciprocally generate an audio or a vibration signal (FIG. 4) in the device, which signal becomes perceivable by each of the two users. Following this, the radio transceivers are switched to a radio communication mode for the users to transmit information to each other (FIG. 5), for example, directly over the radio channel, or the users exchange information about their private telephone numbers, or their own location at the moment, or about a meeting place. Other options are possible as well. For example, the device can be combined with a radio telephone, in which case both the radio telephone and the device itself can operate individually and independently of each other. Following reception of code coincidence signals and confirmation of intention to get acquainted, the computerized device connects the radio telephone automatically or manually, by the user, to the number given by one of the users to the other. Subsequently, the users maintain direct contact by radio telephone. Similarly, connection can be made to wire telephone lines or computer networks directly or through the Internet.

In the absence of coincidence between the codes received and the personal code, these codes are inputted temporarily into the memory and pulsed radio signals of these codes are transmitted, at least once or during a specified time interval, into the propagation medium (FIGS. 6 and 11). Furthermore, the pulsed radio signals of the codes, which do not coincide with the personal code, are transmitted at least during the absence of the pulsed radio signal in the code corresponding to the personal code in at least a majority of data. This specific feature allows each user, carrying a device with a very short range (5–15 m), to find an adequate user beyond the range of the device. For example, a user looked or sought for to get acquainted with is at a distance of 20 m from a first user in the same room of a club or stadium and, naturally enough, cannot pick up radio signals of the first user. However, any other users, who are within the range of the first user's device, upon receiving a radio signal they have no interest in, transmit the unwanted radio signal within the range of their own devices that may overlap the range of the device carried by the user, with whom the first user wants to establish contact. In this case, the targeted transmission of code information specified by the data exchange protocol for these devices prevents unauthorized access to the first user's private information by third persons.

In several more embodiments, where information in codes that do not coincide with the personal codes of the owner can be transmitted, for example, as in the operating mode of the device shown in FIG. 11, a radio signal corresponding to these codes is transmitted only once, so that when this radio signal arrives again the devices ignore it. Radio signals arriving for the first time only are transmitted (retransmitted). In a further possible embodiment, however, the device does not analyze the code of a repeat radio signal in any depth because a detailed analysis has been done previously, and allows it to pass freely from the receiving part to the transmitting part of the device. Or else, a radio signal arriving for the first time is transmitted into the propagation medium for a specified time interval in a specified sequence relative to other similar radio signals, whether this was a single signal in its emission frequency or it was constantly recurring (the first signal of each new signal only can be emitted and transmitted).

When a radio signal carrying a code that does not coincide with the personal code is received, its code is supplemented with an additional code indicating non-coincidence and the fact that this signal is to be passed on, that is, transmitted or retransmitted. The additional code shows for successive users who receive this radio signal that it has arrived from beyond the range of their devices. On coincidence of the coincidence signal transmitted the additional code is removed or a further code is added to show that retransmission is to be terminated, as the users have located one another.

Following below is a description of an embodiment of the method of remote wireless transmission and reception of code information for users to search for and identify one another.

Device #1 sends (FIG. 1) an owner profile (OP1) into the propagation medium, and devices #2, #3 and #4 receive OP1 and compare it with the target profiles stored in their memories. Device #3 finds a sufficient rate of coincidence between OP1 and one of its target profiles and sends the profile of its owner (OP3) to the address of Device #1 (FIG. 2). Device #1 receives OP3 and compares it with the target profiles stored therein. If sufficient coincidence is found, Device #1 sends a coincidence message (CM) back to the address of Device #3 (FIG. 3). Both devices inform their owners of profile coincidence (FIG. 4). A possible scenario of radio traffic that follows is continued exchange of directly transmitted (Unicast) messages, which potentially leads to establishment of personal contact (FIG. 5). Retransmission (for example, using a Unicast mode) consists in Device #1 sending a message (UM 1-3) to Device #3, which is beyond the range of the radio signal of Device #1, but in this case Device #2 operates as a repeater, delivering the message to Device #3 (FIG. 6).

A portable device 1 for remote wireless transmission of code information comprises a radio transceiver having an antenna(s) 2, a receiving part 3 to receive pulsed input radio signals, and a transmitting part 4 to transmit pulsed output signals through the propagation medium. The radio transceiver is associated with a mini-computer 5 comprising a central processor 6 associated with a memory unit 7, a software unit 8, a unit 9 of digital-to-analog and analog-to-digital converters, and an input-output unit 10. The mini-computer has a display 11 for visual representation of information received and transmitted (for example, a liquid crystal display panel), a unit 12, for example, an alphanumeric keyboard (for example, a key, film, LCD panel emulated, or any other keyboard) to input data into the memory unit of the mini-computer, and an audio or a vibration announcing unit 13 to emit audio signals. Also, the mini-computer has a power supply (for example, a rechargeable battery), additional units essential for the operation and interconnection of the units named, for example, a circuit board, a device body, a clock frequency generator, etc.

The device may additionally (but not necessarily) comprise an owner call unit (an audio signal generator, a mechanical vibration generator, etc.), and any other components and units to enhance the operating efficiency of the device and to give it secondary functions (for use as an electronic notebook, etc.).

Furthermore, the mini-computer is provided with appropriate software to perform the functions of receiving analog signals from the receiving part thereof, converting them into digital signals, comparing the data of these signals with the data stored in the memory unit, processing the digital signal carrying data in a code corresponding to the personal code stored in the memory unit, and the data keyed in from the keyboard to generate personal codes, and outputting an analog signal confirming reception of data in a coincidence code to the transmitting part to transmit it through the propagation medium within the framework of a common protocol, wherein, according to the invention, the minicomputer is capable of performing an additional function of inputting digital signals in codes that do not coincide with the personal codes stored in the memory temporarily into the memory unit, and outputting these signals to the transmitting part to have them transmitted through the propagation medium.

Also, the radio transceiver of the device may be adapted to be connected directly to a wire or wireless telephone system, or a computer network, or to a radio communication system.

The current state of the art in microcomputer technology and radio engineering allows the above-described set of components to be designed in the form of a compact (pocket-size) device of small weight and low power requirements. The so-called two-way pager (also known as Twager, which is a registered trademark of the Nexus company) is an example of an existing device comprising all the above-mentioned components.

The software designed to be used in the processor to manage the data stored in the memory performs at least the following functions:

controlling the operation of the system components, such as receiving information from the input unit, outputting the information to the output unit, processing the information, sending the information into the air with the aid of the digital information converter and transmitter, receiving information from the air with the aid of the receiver and the digital information converter, etc.;

forming one or more owner profiles in the device memory, using the information input unit and, possibly, the information output unit;

forming one or more target profiles in the device memory, using the information input unit and, possibly, the information output unit;

comparing the profiles according to a specified algorithm (or a set of algorithms, including the use of odd logic) to obtain a formalized evaluation of profile coincidence rate; and inputting the digital signals of the codes that do not coincide with the personal codes stored in the memory unit temporarily to the memory unit and outputting these signals to the transmitting part for transmission thereof through the propagation medium, using a specified output algorithm.

Another possible function is switching the radio transceiver from the limited range mode to the long-range wire or wireless telephone communication, or radio communication, or to the computer network communication mode.

The software may also be adapted to perform additional functions, such as calling the device owner through the audio or vibration call unit, transmitting and retransmitting, games involving one or more players, and secondary functions (electronic notebook, etc.). Games with two or more players are a further additional function of the device. In addition to common games such as Tetris and other kinds used repeatedly in pocket devices, the device of the present invention can be assigned the following game functions: group games (logical, arcade, etc.) involving exchange of messages by transmitting radio signals from one device to another, exchanging games by loading their computer codes and data from other devices of the type described herein, including radio messages. An example of radio communication between users to make wireless connection between portable game devices of two users and maintain a group game session is provided by the invention of WO, 95/26790, A63F 3/02, G06F 161/00, G01S 13/02, published Oct. 12, 1995.

It is also possible to use additional software designed for operation on other platforms (for example, in a personal computer) and performing additional functions, or taking over some of the functions of the basic software (for example, formation of profiles for subsequently downloading them into the device memory).

Each device stores in its memory one or more owner profiles and one or more target profiles.

Each device may, at every single moment, be in one of at least three modes:
1. Off;
2. On, to receive/transmit radio signals addressed to a particular device (hereinafter "Unicast" mode) only;
3. On, to receive radio signals addressed to all devices of this type (hereinafter "Awaiting Friend" mode); and
4. On, to transmit radio signals addressed to all devices of this type (hereinafter "Seeking Friend" mode).

In the Seeking Friend mode, it may be advantageous to perform the Awaiting Friend functions, that is, reception of radio signals addressed to all devices of this type (hereinafter "broadcast signal" or "broadcast").

Figure 8:
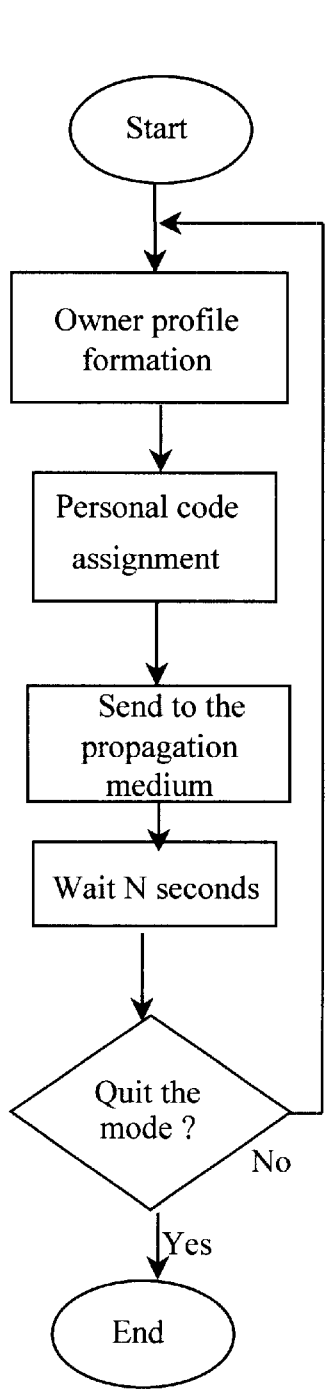
FIG. 8 shows a Seeking Friend mode.

In the Seeking Friend mode (FIG. 8), a user keys in profile data and inputs it into the device memory (the profile can be formed in advance and can be stored in the device memory, and there may be several preformed profiles stored in the device memory, each assigned a personal code of its own). The device transmits periodically (for example, at an interval of 5seconds, or on the owner's instruction) into the air a pulsed radio signal containing one of the owner's profiles in a personal code (specifically chosen by the owner). Depending on advance settings, the device verifies, in accordance with an algorithm, the need for a next radio signal to be sent. The query is made to end transmission of a radio signal carrying the owner's code, or, on expiration of a time interval set by the device owner to determine whether or not continued search is justified, or by reason of a response radio signal having been received.

Figure 9:
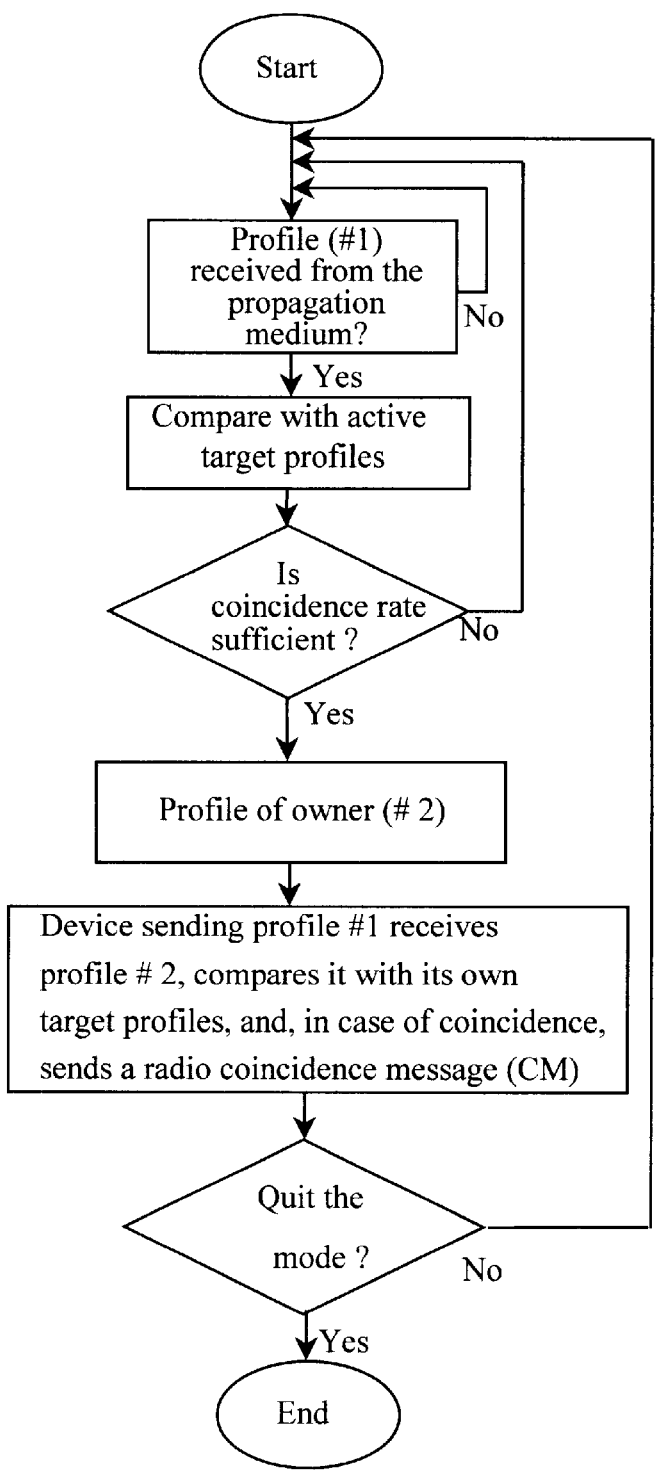
FIG. 9 shows an Awaiting Friend mode.
Figure 12:
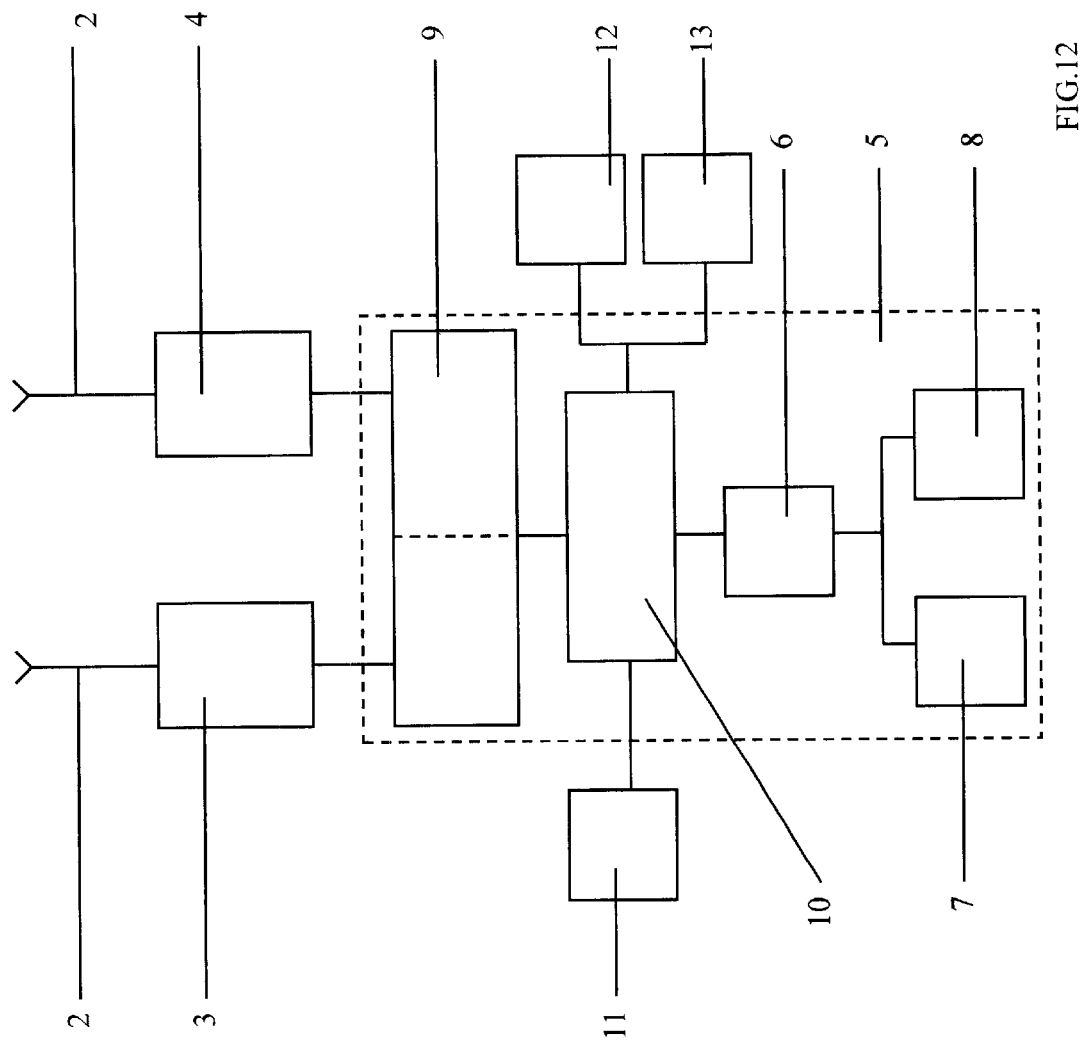
FIG. 12 shows a block diagram of a portable device for remote wireless transmission of code information.

All other devices within the effective range of the first device and set to the Awaiting Friend mode in the reception zone receive this radio signal (FIG. 9) and compare the profile received with the target profiles stored therein. If the coincidence rate of the profile received and one of the target profiles meets certain criteria, the device receiving that profile sends, automatically or on its owner's instruction, one of its owner's profiles in the Unicast mode back to the first device.

Next, the first device compares the profile received with the target profiles stored therein. If the coincidence rate of the profile received and one of the target profiles meets certain criteria, the first device sends back in the Unicast mode an encoded message informing the second device of coincidence. Whereupon, both devices may inform their owners about mutual coincidence (FIG. 10) and allow their owners to establish contact, for example, by keying in and sending arbitrary messages in the Unicast mode.

Retransmission and global retransmission modes may be used to expand the effective range of message transmission.

On receiving a message addressed to any other device of this type and/or a broadcast message, the repeater 14 automatically, immediately or after a brief interval, sends (retransmits) it once or several times into the air without altering its data (contents). At the end of retransmission, the device may remove the retransmitted message from its memory.

If, therefore, there is a sufficiently large number of devices of this type within a certain area, messages can be relayed to distances exceeding many times the range of the radio signal transmitted from a single device.

The effective range of message transmission can be expanded still further in a mode that can tentatively be called global retransmission. Global retransmission requires specialized devices (global repeaters 15) capable of receiving and retransmitting radio signals carrying messages of above-described types, which specialized devices are interconnected by communication channels 16 (radio communication system) or 17 (wire telephone or computer networks), which can retransmit information over large distances. In addition to common retransmission functions described above, global repeaters 15 relay the messages received to other global repeaters 15 via communication channels 16 or 17. In turn, a global repeater 15 receiving a message via communication channels transmits it into the air by the above-described conventional Unicast or broadcast methods. The Internet is an example of communication channels, allowing messages to be retransmitted around the globe.

In most instances, global repeaters will preferably be designed as stationary or semi-stationary devices having transceiver units of enhanced power (ref. WO, 88/08140, G01S 3/02, H04B 7/02, 15/00, published Oct. 20, 1988).

Another method can be developed on the basis of the method considered above to effect wireless transmission or reception of code information over distance for establishing contact between users, wherein, in a portable computerized device of one user combined with a radio transceiver, data representing at least one array of generated information is inputted into the memory from an alphanumeric keyboard. This data is then converted into the user's personal code and the user's personal code is transmitted in the form of pulsed radio signals through the propagation medium to be received by the radio transceiver of another portable computerized device of another user within the effective range of the radio transceiver of the first device.

Furthermore, the first user can receive pulsed radio signals of the codes transmitted by the radio transceivers of the portable computerized devices of other users, and compare the codes received with the personal code to detect a radio signal carrying a code corresponding to the user's personal code. When the user's personal code is found to coincide with one of the codes received from other users, the user decodes the received data corresponding to his code and outputs it for visual or audio perception thereof. Thereafter, the first user can establish direct contact with such other user whose code coincides with the first user's personal code.

In the absence of coincidence between the codes received and the first user's personal code, however, the first user inputs the codes of other users received in the form of radio signals at the input of the receiving part temporarily into the memory of his device, assigns them, if necessary, in accordance with a routing algorithm, an additional or auxiliary code of, for example, non-coincidence and need of retransmission, and then retransmits pulsed radio signals of these codes at least once or during a specified time interval through the propagation medium to be received by the radio transceivers of other portable computerized devices or repeaters operating within the range of at least one radio transceiver or repeater emitting pulsed code radio signals, for these radio signals to be retransmitted further on, wherein the radio transceivers of each portable computerized device retransmits the pulsed radio signals of codes that do not coincide with the first user's personal code at least during the absence of a pulsed radio signal carrying a code corresponding to the personal code.

For example, in accordance with one of possible routing algorithms, following transmission of a pulsed coincidence radio signal and a response pulsed radio signal, transmission of radio signals in these codes is terminated. Transmission is terminated on arrival of a code coincidence radio signal or a response coincidence signal.

After the pulsed coincidence radio signal and the response pulsed radio signal have been transmitted, transmission of radio signals in these codes can be terminated, because the users switch to radio communication or video data transmission, or telephone communication, or computer network communication mode.

A method of wireless remote transmission and reception of code information may also consist in that, in a portable computerized user device, combined with a radio transceiver, data representing an array of generated information prepared for another user is inputted into the memory from an alphanumeric keyboard, the data is converted into a personal code of the user; the personal code of the first user is transmitted as pulsed radio signals through the propagation medium to be received by the radio transceiver of the portable computerized device of the other user operating within the range of the radio transceiver of the computerized device of the first user; the pulsed code radio signals emitted by the radio transceivers of the portable computerized devices of other users are received; the codes received are compared with the personal code to detect a radio signal carrying a code corresponding to the first user's personal code; and, on coincidence of one of the codes received from other users with the first user's personal code, the received data corresponding to that code is decoded and outputted to be perceived.

For code information to be transmitted to a distance exceeding the effective range of the radio transceiver of the first user's computerized device, the radio transceivers of the other users' computerized devices operating within the range of the radio transceiver of the first user's computerized device, in the absence of coincidence between the first user's code received and the personal code input the first user's personal code temporarily into the memory; assign, if necessary, an additional non-coincidence codes and a (re) transmission code, if required; and retransmit, at least once or during a specified time internal, pulsed radio signals of that code into the propagation medium to be received by the radio transceivers of the users' portable computerized devices or repeaters operating within the range thereof for subsequent retransmission of these radio signals, wherein the radio transceivers of each portable computerized device retransmit pulsed radio signals of the codes, which do not coincide with the personal code, at least during the absence of a pulsed radio signal carrying a code corresponding to the personal code.

The implementation of this method is illustrated schematically below:

Device #1 transmits (FIG. 1) an owner profile (OP1) into the propagation medium, and Devices #2, #3 and #4 receive OP1 and compare it with the target profiles stored therein. Device #3 detects a sufficient rate of coincidence between OP1 and one of its target profiles and sends its owner's profile (OP3) to Device #1 (FIG. 2). Device #1 receives OP3 and compares it with the target profiles stored therein. When sufficient coincidence is detected, Device #1 sends back a coincidence message (CM) to Device #3 (FIG. 3). Both devices inform their owners of profile coincidence (FIG. 4). In a possible scenario, direct (Unicast) messages are then exchanged, leading, in principle, to establishment of personal contact (FIG. 5). In a retransmission (Unicast) example, Device #1 sends a message (UM 1-3) addressed to Device #3, which is outside the range of the radio signal of Device #1, but in this case, Device #2 operates as a repeater, delivering the message to the repeater that passes the message on to Device #3 (FIG. 6).

In global retransmission (broadcast example), Device #1 sends a broadcast message (BM), for example, in a bar during a football match viewing session. All devices in the same bar receive the message immediately, and besides the same message is also received by all the devices in another bar, provided, however, that both bars are equipped with global repeaters. Also, the message can be transmitted from one bar to the other on the Internet, when the message sent to a global repeater is entered therefrom into the Internet computer network and transmitted from the latter to another global repeater, which transmits these messages to users, for example, #22, #39 and #41.

The auxiliary components of a message, such as, for example, its route, can be modified.

The capability of the device described herein to transmit and receive Unicast and broadcast messages makes it suitable for use within a surprisingly wide range of applications and allows it to be described as a general-purpose communication device. In addition to the obvious application methods already described above, the present device (possibly combined with additional devices capable of receiving and transmitting messages in a desired format) can be used to:

1. Facilitate socializing in a group of people (for example, dissemination of an agenda at a conference, exchange between devotees at a performance, etc.);
2. Disseminate general information (flight arrival and departure reports at airports, location and work schedules of hotel services at hotels, etc.); and
3. Obtain specialized information from particular sources, for example, Internet servers.

All the above-described methods are specific in that they can be realized both in stationary portable computerized devices, that is, devices that do not move around, and in devices moving constantly relative to one another. If a first user sends a message from point A to point B, which is beyond the effective range of the first user's transceiver, his message will arrive in point B by being retransmitted via the transceivers of other users, the effective ranges of whose transceivers overlap. The first user may in the meantime have moved from point A to point C. A response radio signal sent to him can be transmitted via other users, the effective ranges of whose transceivers mutually overlap. In this case, the response radio signal transmission route may not be the same as the transmission route of the query radio signal.

Furthermore, radio signals are retransmitted from one radio transceiver of a portable computerized device to another, stationary or mobile radio transceiver of a portable computerized device or repeater via the radio transceivers of computerized devices or repeaters moving relative to them and with respect to one another, or, in a possible alternative, radio signals are retransmitted from one stationary radio transceiver of a portable computerized device or repeater to another stationary radio transceiver of a portable computerized device or repeater via the radio transceivers of portable computerized devices or repeaters moving relative to them and with respect to one another.

COMMERCIAL APPLICATION

The present invention is commercially feasible because the methods thereof are realized in devices developed on the basis of components widely used at present in designing computer hardware.

What is claimed is:

1. A method of wireless remote transmission and reception of code information by users to seek and identify one another, wherein, in a portable computerized device combined with a radio transceiver, data representing at least one array of generated information is inputted into the memory; the data in each information array is then converted into a personal code; at least one personal code is transmitted in the form of pulsed radio signals through the propagation medium to be received by the radio transceiver of at least one other portable computerized device operating within the range of the radio transceiver of the first device; the pulsed code radio signals emitted by the radio transceivers of the other portable computerized devices are received; the codes received are compared with at least one personal code; on coincidence of at least one of the codes received and the personal code in at least a majority of the data, the received data corresponding to that code is decoded and outputted for visual or audio perception of the information array corresponding to that code; on coincidence of the information array received and the information array stored in the memory, a pulsed coincidence radio signal is transmitted in the coincidence code to establish direct contact with the user of that code, and a response pulsed personal code radio signal confirming the establishment of direct contact is received for the users to identify one another, characterized in that, after the pulsed personal code radio signals confirming the establishment of direct contact have been received, the users switch their radio transceivers to a direct communication mode to enable the users to communicate with each other, while in the absence of coincidence between the codes received and the personal code, these codes are inputted temporarily into the memory and pulsed radio signals of these codes are emitted, at least once or several times during a specified time interval, into the propagation medium, the pulsed radio signals of the codes that do not coincide with the personal code being transmitted at least during the absence of a pulsed radio signal carrying a code corresponding to the personal code in at least a majority of data.

2. A method of remote wireless transmission and reception of code information for users to establish contact with one another, wherein, in a portable computerized device of a first user combined with a radio transceiver, data representing at least one array of generated information is inputted to the memory; the data in this information array is then converted into a personal code of the user; the first user's personal code is transmitted in the form of pulsed radio signals through the propagation medium to be received by the radio transceiver of another portable computerized device of a second user, operating within the range of the radio transceiver of the first device; the pulsed code radio signals emitted by the radio transceivers of the portable computerized devices of other users are received; the codes received are compared with the personal code to detect a radio signal carrying a code corresponding to the personal code of the user; on coincidence of one of the received codes of other users and the personal code, the received data corresponding to that code is decoded and outputted for visual or audio perception thereof, characterized in that, on coincidence the radio transceivers of both users are switched to the mode of direct communication between the users, and in the absence of coincidence between the codes received and the personal code of the user, the codes of the other users are inputted temporarily into the memory, and the pulsed radio signals of these codes are transmitted, at least once or several times during a specified time interval, into the propagation medium to be received by the radio transceivers of the other portable computerized devices or repeaters operating within the range of at least one radio transceiver or repeater emitting pulsed code radio signals, for these radio signals to be then retransmitted; the radio transceivers of each portable computerized device retransmitting the pulsed radio signals of the codes, which do not coincide with the personal code, at least during the absence of a pulsed radio signal carrying a code corresponding to the personal code, the radio signals being retransmitted from one radio transceiver of a portable computerized device to another stationary or mobile radio transceiver of a portable computerized device or repeater via the radio transceivers of portable computerized devices or repeaters moving relative to them and with respect to one another.

3. A method of claim 2, characterized in that, when an information array received in a code is found to correspond to the information array stored in the memory, a pulsed coincidence radio signal is transmitted in the coincidence code to establish direct contact with the user of that code and a response pulsed personal code signal confirming the establishment of direct contact is received.

4. A method of claim 2, characterized in that, following the transmission of a pulsed coincidence radio signal and a pulsed response radio signal, transmission of radio signals in these codes is terminated.

5. A method of claim 2, characterized in that, following the transmission of a pulsed coincidence radio signal and a pulsed response radio signal, transmission of radio signals in these codes is terminated and the device is switched to a radio communication mode or video data transmission mode, or a telephone communication mode, or to a computer network communication mode.

6. A method of remote wireless transmission and reception of code information, wherein, in a portable computerized device of a first user combined with a radio transceiver, data representing an array of generated information prepared for another user is inputted into the memory; the data is converted into a personal code; the personal code of the first user is transmitted in the form of pulsed radio signals through the propagation medium to be received by the radio transceiver of another user's portable computerized device operating within the range of the radio transceiver of the computerized device of the first user; the pulsed code radio signals emitted by the radio transceivers of the portable computerized devices of other users are received; the codes received are compared with the personal code to detect a radio signal carrying a code corresponding to the personal code of the first user; on coincidence of one of the codes received from the other users and the personal code of the first user, the received data corresponding to that code is decoded and outputted for perception thereof, characterized in that, for the code information to be transmitted to distances exceeding the effective range of the radio transceiver of the computerized device of the first user, the radio transceivers of the computerized devices of the other users, operating within the range of the radio transceiver of the computerized device of the first user, in the absence of coincidence between the received code of the first user and the personal code, the personal code of the first user is inputted temporarily into the memory; an additional non-coincidence and transmission code is assigned thereto, and pulsed radio signals of that code are then transmitted once or during a specified time interval into the propagation medium to be received by the radio transceivers of the portable computerized devices of the users or repeaters operating within the range thereof, for these radio signals to be then retransmitted; the radio transceivers of each portable computerized device retransmit the pulsed radio signals of the codes, which do not coincide with the personal code, at least during the absence of a pulsed radio signal carrying a code corresponding to the personal code, the radio signals being retransmitted from one stationary radio transceiver of the portable computerized device or repeater to another stationary radio transceiver of the portable computerized device or repeater through the radio transceivers of portable computerized devices or repeaters moving relative to them and with respect to one another.

7. A portable device for remote wireless transmission of code information, comprising a radio transceiver having a receiving part to receive pulsed input radio signals; a transmitting part to transmit pulsed output signals to the propagation medium; a processor associated with these parts and forming, together with a memory unit and a software unit, a digital-to-analog and analog-to-digital converter unit, and an input-output unit, a minicomputer, having a display to visually represent the information received and transmitted; a unit to input data into the memory unit of the computer, and an announcing unit to output audio signals, wherein the mini-computer is provided with suitable software to perform the functions of receiving analog signals from the receiving part, convert them into digital signals, compare the data carried by these signals with the data stored in the memory unit, process a digital signal carrying data in a code corresponding to the personal code stored in the memory unit and the data inputted from a keyboard to form personal codes, convert the digital signals into analog signals, and output an analog signal confirming reception of coincidence code data to the transmitting part to transmit the same through the propagation medium within the framework of a single protocol, characterized in that, the mini-computer is capable of performing an additional function of inputting digital signals of codes that do not coincide with the personal codes stored in the memory unit temporarily into the memory unit and outputting these signals to the transmitting part to transmit the pulsed radio signals of codes that do not coincide with the personal code through the propagation medium during at least the absence of a pulsed radio signal carrying the code corresponding to the personal code, and the radio transceiver of the device is adapted to be connected to a wire or wireless telephone communication system, or a computer communication network, or to a radio communication network.

* * * * *